May 27, 1930.  C. F. SHELTON  1,760,323
HOSE CONNECTION FOR AIR GAUGES
Filed June 22, 1926
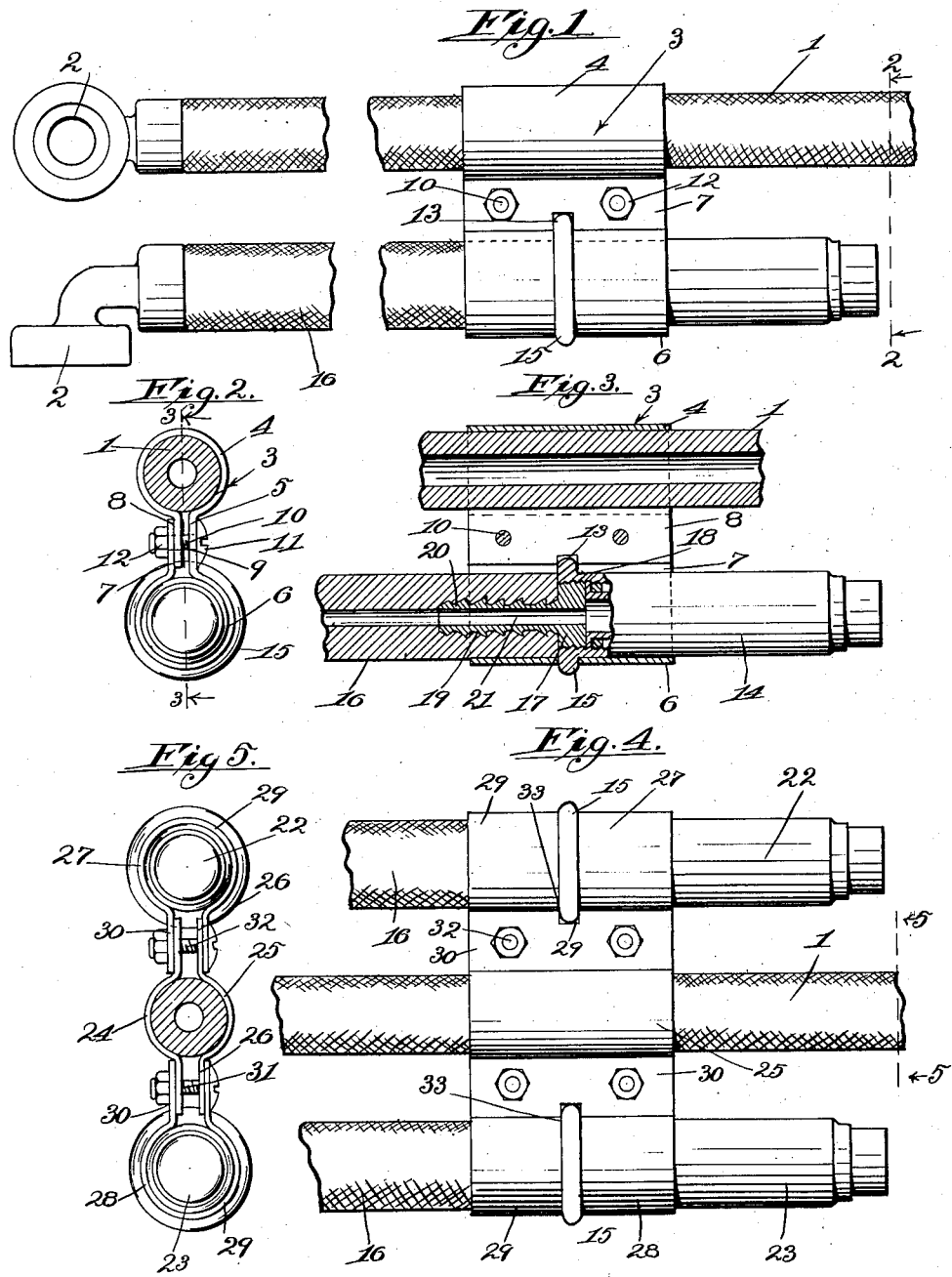
Inventor
Charles F. Shelton
by Hazard and Miller
Attorneys Patented May 27, 1930

1,760,323

UNITED STATES PATENT OFFICE

CHARLES F. SHELTON, OF LOS ANGELES, CALIFORNIA

HOSE CONNECTION FOR AIR GAUGES

Application filed June 22, 1926. Serial No. 117,705.

My invention is a hose connection for air gauges adapted to hold a hose for filling a tire or the like and also to hold a gauge connected to a separate strip of hose.

An object of my invention is the construction of a hose connection for air gauges in which a gauge is positioned conveniently to use immedately after applyng to a tire or the like, the gauge being separate from the air inlet tube or pipe but positioned so that it is permanently connected therewith.

More specifically, an object of my invention is to provide a clamping device secured around an air supply hose and in this clamping device I mount an air gauge with a separate strip of hose with an air chuck thereon so that this connection may be fitted over a valve stem and the pressure read in the gauge.

Another feature of my invention is mounting a double clamp on the air supply hose with a low and a high pressure gauge secured in the clamp, each gauge having a strip of hose with pump connections thereon so that when inflating a tire the pressure in ordinary and balloon tires may be readily ascertained.

My invention will be more readily understood from the following description and drawings, in which:

Figure 1 is a side elevation of my hose connection, showing the air hose, the gauge and the hose connected to the air gauge;

Fig. 2 is a section taken on the line 2—2 of Fig. 1 in the direction of the arrow;

Fig. 3 is a longitudinal section through Fig. 2 on the line 3—3 of Fig. 2;

Fig. 4 is a view similar to Fig. 1, showing a double clamp with a high and a low pressure gauge mounted therein;

Fig. 5 is a transverse section on the line 5—5 of Fig. 4.

Referring first to the construction of Figs. 1, 2 and 3, the ordinary air supply hose for air under pressure is designated by the numeral 1 having an ordinary type of air chuck 2 attached thereon. The chuck is of such character that it may be fitted to a tire stem to fill the tire in the ordinary manner. A clamp designated generally by the numeral 3 is secured to the hose. The particular form of clamp is substantially as follows:

A strip of metal has a circular bend 4 engaging around the air supply hose 1, a straight web 5, a second circular bend 6, an inner web end 7 being a continuation of the smaller circular bend and an outer web end 8 being a continuation of the second circular bend 6. These webs are provided with alined apertures 9 and a bolt 10 having a head 11 and a nut 12 is utilized to secure the webs of the clamp tightly together. The circular bend 6 is provided with a slot 13 extending therearound. An air gauge 14 is constructed with a bead 15, this bead extending through the slot 13 and thereby securing the gauge tightly in the clamp.

A strip of hose 16 with an air chuck 2 is secured to the gauge by means of a plug 17 which is screw threaded into the interior cylindrical surface 18 of the gauge and has a connecting shank 19 with serrations or teeth 20 gripping the internal surface of the hose. The plug and shank have an air duct 21 therethrough.

The gauge is preferably rigidly clamped in the clamping member and the length of the hose from the clamp to the air chuck is of sufficient length to allow sufficient flexibility thereof to easily reach the valve stems even when inaccessibly mounted on automobile, truck or aeroplane wheels or the like. The air chucks may be secured to the two strips of hose in any suitable position.

Where it is desired to use two gauges I have a mounting similar to that shown in Figs. 4 and 5 in which the gauge 22 may be designated as a high pressure gauge and 23 as a low pressure gauge suitable for ordinary and balloon tires. In this case the gauge constructions are the same as that shown in Figs. 1, 2 and 3; the clamping device, however, is differently constructed, having a central section 24 formed of two bowed strips 25 adapted to fit around the hose 1 and having straight opposite ends 26.

The end sections 27 and 28 each have a circular section designated by the numeral 29 and straight ends 30. Apertures 31 in alinement extend through the ends 26 and 30 and bolts 32 are fitted therein and form the clamping means. The curved sections 27 and 28 are formed with slots 33 of a similar character to the slot 13 of Fig. 1.

Therefore, with this construction it will be seen that the clamp is rigidly attached to the air hose 1 and that the gauges with their respective strips of hose are also firmly secured to the clamp. Therefore either gauge is conveniently positioned to be used with the filling hose.

It will thus be seen that I have provided a simple construction in which a gauge may be conveniently mounted in reference to the tire filling hose and there is no danger of it being mislaid, lost or stolen.

It will be noted that my clamp forms a secure support for the gauge and also secures the hose on the shank. This type of gauge has a cylindrical wall with the bead 15 at one end, this bead has the plug 17 with the shank 19 extending therefrom, and the hose is pressed over the shank, the serrations becoming embedded in the hose. The clamp has a slot in which the bead 15 fits and the circular part of the clamp grips the wall of the gauge and also grips the exterior of the hose, thus the gauge is securely held in position and the hose is securely attached to the shank. If desired, such a clamp may be used to secure the hose to the end of the gauge and in addition the clamp can be designed to support a flexible air hose.

It is obvious that the form of the clamp utilized may be considerably modified. However, such changes in general construction or in specific details would be within the spirit of my invention as set forth in the description, drawings and claim.

Having described my invention, what I claim is:

A hose connection for air gauges comprising a strip of metal having a web with tubular portions connected thereto, web ends extending from the tubular portions over the web, the ends and the web being secured to each other by bolts, one of the tubular sections having an annular peripheral slot adapted to receive the bead on a gauge, and said tubular portion being adapted to secure a gauge and a hose secured thereto, the other tubular portion being adapted to secure a flexible hose, the said web having a slot therethrough to receive part of the bead of the gauge.

In testimony whereof I have signed my name to this specification.

CHARLES F. SHELTON.